Aug. 29, 1950     F. N. WINDSOR     2,520,869
FLUID FLOW INDICATOR
Filed Sept. 1, 1948

INVENTOR.
FREDERICK N. WINDSOR
BY
Brown, Critchlow, Flick & Peckham
his ATTORNEYS.

Patented Aug. 29, 1950

2,520,869

UNITED STATES PATENT OFFICE 2,520,869

FLUID FLOW INDICATOR

Frederick N. Windsor, Penn Township, Allegheny County, Pa., assignor to Mine Safety Appliances Company, Pittsburgh, Pa., a corporation of Pennsylvania Application September 1, 1948, Serial No. 47,188

1 Claim. (Cl. 116—117)

This invention relates to apparatus for indicating to an observer when a fluid is flowing through a fluid line.

It is among the objects of this invention to provide a fluid flow indicator which shows at a glance whether or not fluid is flowing through a line, and which is very sensitive to the flow of fluid so that it instantly indicates starting or stopping of the flow.

In accordance with this invention a housing is provided with a fluid passage through it having an inlet and an outlet for connection in a line which carries the fluid, the flow of which it is desired to indicate. The housing has an observation opening extending laterally from the side of the passage to the outside of the housing, and a window is sealed in that opening to keep fluid from escaping through it. Slidably disposed in the housing passage is a slide which blocks the passage when the slide is located back between the observation opening and the passage inlet. The slide is held in that position by a spring when fluid is not flowing through the housing. When fluid is withdrawn from the passage outlet the pressure of the fluid against the other end of the slide pushes it forward against the resistance of the spring until the slide is in view through the window. The housing is provided with a by-pass which, when the slide is in its forward visible position, conducts fluid past the slide in the passage. The by-pass may be formed by the inner end of the observation opening, and the slide may be provided with by-pass openings which the housing by-pass connects. Consequently, the presence of the slide in its forward position indicates that fluid is flowing through the housing.

Figure 1:
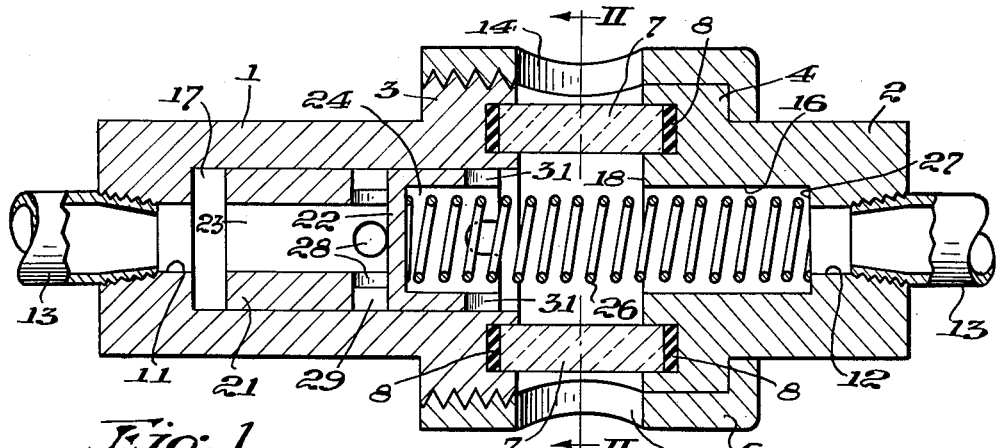
Figure 2:
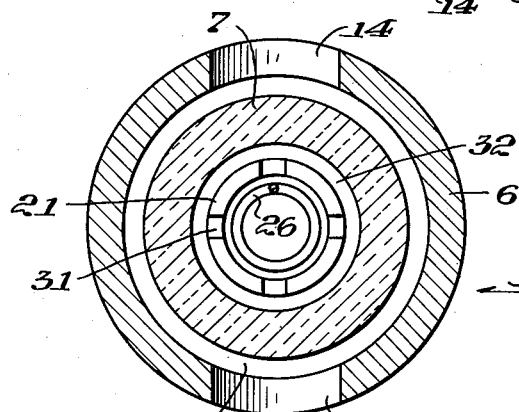
Figure 3:
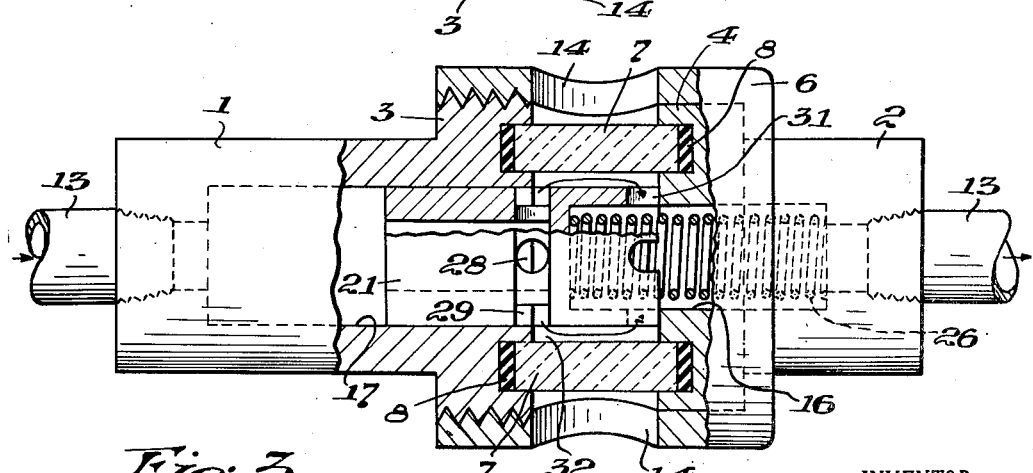

The preferred embodiment of the invention is shown in the accompanying drawing in which Fig. 1 is a longitudinal section through my flow indicator when nothing is flowing through it; Fig. 2 is a transverse section taken on the line III—III of Fig. 1; and Fig. 3 is a view similar to Fig. 1, showing the position of the slide when fluid is flowing through the housing.

Referring to Figs. 1 and 2 of the drawings, two tubular members 1 and 2 are disposed in axial alignment with their adjacent ends encircled by integral flanges 3 and 4, respectively. The flange of member 1, called the slide retainer, is threaded to receive a threaded clamping collar 6 that clamps over the flange of the other tubular member, called the spring retainer. The two retainers are spaced apart by a cylindrical window 7 seated in opposed annular grooves in the adjacent end faces of the retainers. The ends of the window press against annular sealing gaskets 8 disposed in the grooves. The collar is drawn up tightly enough to clamp the window between the two retaining members 1 and 2.

The housing thus formed has an axial passage through it provided with a reduced inlet 11 and outlet 12 adapted to be connected into a line 13 that carries the fluid whose flow is to be indicated. The collar 6 is provided with circumferentially spaced openings 14 to permit the central portion of the passage to be viewed through the window. The left-hand end of the portion 16 of the axial passage in the spring retainer 2 is a little smaller in diameter than the main portion 17 of the passage in the slide retainer 1 so that a radial shoulder 18 is formed inside the window.

Slidably mounted in tubular member 1 is a passage-blocking slide 21 that fits rather loosely in passage 17 so that fluid can leak past it. The slide is hollow with open ends separated by a transverse wall 22. That is, the inlet end of the slide is provided with an axial bore 23, while the outlet end of the slide is provided with a similar bore 24. The two bores are separated by wall 22.

When fluid is not flowing through the line the slide is held entirely inside the slide retainer by means of a coil spring 26 that engagegs its transverse wall 22 and the shoulder 27 formed by the outlet 12 of the passage. In this rear position the slide is not seen through the window, so it is known that fluid is not flowing through the housing. The fluid pressures at opposite ends of the slide balance by leaking past the slide. However, the moment fluid is withdrawn from the outlet of the housing passage a pressure drop across the slide is produced which results in the fluid at the inlet end of the housing pushing against the slide and thereby moving it forward against the resistance of the coil spring until its front end strikes shoulder 18, as shown in Fig. 3. This movement of the slide uncovers a plurality of radial holes with which it is provided, so that fluid can flow past the slide and thereby flow through the housing. Some of these holes 28 connect the inner or front end of slide bore 23 with a groove 29 around the outside of the slide, while the rest of the holes 31 are through the side wall of the slide at its front end. The groove is spaced such a distance from the front end of the slide that it is uncovered only when the slide is in its forward position against shoulder 18. That is, groove 29 and front slide holes 31 open into the space 32 between the inside of the window and the outside of the slide, which thereby forms a by-pass around the slide. Consequently, when the slide is seen through the window to be in its forward position, it is known that fluid is flowing through the housing. When the flow is shut off, the fluid pressure at the opposite ends of the slide becomes equal and the spring then pushes the slide back into the slide retainer 1. The disappearance of the slide from view through the window shows that flow has stopped.

According to the provisions of the patent statutes, I have explained the principle of my invention and have illustrated and described what I now consider to represent its best embodiment. However I desire to have it understood that, within the scope of the appended claim, the invention may be practiced otherwise than as specifically illustrated and described.

I claim:

A fluid flow indicator comprising a housing provided with a fluid passage therethrough having an inlet and an outlet for connection in a fluid line, the housing having an observation opening extending laterally from the side of the passage to the outside of the housing, a window sealed in said opening, a hollow slide disposed in said passage and having open ends with a transverse wall between them, the side wall of the slide being provided with openings through it on opposite sides of said transverse wall, and a spring for holding the slide back between said observation opening and the passage inlet when fluid is not flowing through the housing but allowing the fluid behind the slide to push the slide forward into view through the window when fluid is withdrawn from the passage outlet, said housing having a by-pass for connecting the outer ends of said slide openings on opposite sides of said transverse wall when the slide is in its forward position, whereby the presence of the slide in its forward position indicates that fluid is flowing through the housing.

FREDERICK N. WINDSOR.

REFERENCES CITED

The following references are of record in the file of this patent:

UNITED STATES PATENTS

| Number | Name | Date |
|---|---|---|
| 455,633 | Messinger | July 7, 1891 |
| 828,108 | Graham | Aug. 7, 1906 |
| 1,910,752 | Coles | May 23, 1933 |
| 2,136,261 | Anderson | Nov. 8, 1938 |